United States Patent

[11] 3,628,255

[72] Inventor John R. Golden
 Tulsa, Okla.
[21] Appl. No. 880,019
[22] Filed Nov. 26, 1969
[45] Patented Dec. 21, 1971
[73] Assignee Gemco, Inc.
 Tulsa, Okla.

[54] APPARATUS FOR TEACHING OR TESTING AN APPLICANT
 8 Claims, 8 Drawing Figs.

[52] U.S. Cl. .................................................. 35/9 E,
 35/48 R
[51] Int. Cl. ..................................................... G09b 7/06
[50] Field of Search .......................................... 35/9 R, 48 R

[56] References Cited
 UNITED STATES PATENTS
 Re.23,030 8/1948 Holt .............................. 35/9 X
 2,835,052 5/1958 Raich et al. ................... 35/9
 3,300,875 1/1967 Nisbet ........................... 35/9
 3,516,176 6/1970 Cleary et al. .................. 35/9

Primary Examiner—Wm. H. Grieb
Attorney—Head & Johnson

ABSTRACT: This invention relates to an apparatus for teaching or testing an applicant. More particularly, the invention relates to an apparatus for teaching or testing an applicant including a rear lighted screen for viewing by the applicant, a projector for projecting a slide onto the rearward side of the screen, the projector including means for projecting an image displaying a question section in the upper portion of the screen and an answer section on the lower portion of the screen, a shield supported adjacent the screen and pivotally positionable between a first and second position, the first position of the shield obstructing the answer portion and the second position allowing the answer portion to be displayed on the screen, and means of pivoting the shield between the first and second position at appropriate times. A further embodiment includes means of automatically advancing the projector in random automatic unpredictable sequence.

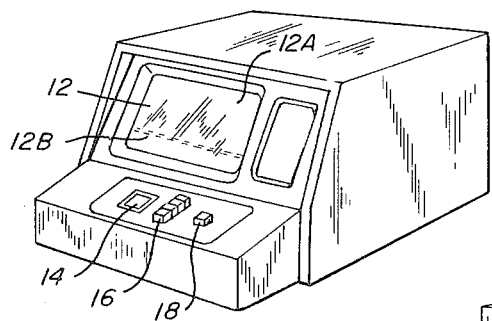
FIG. 1
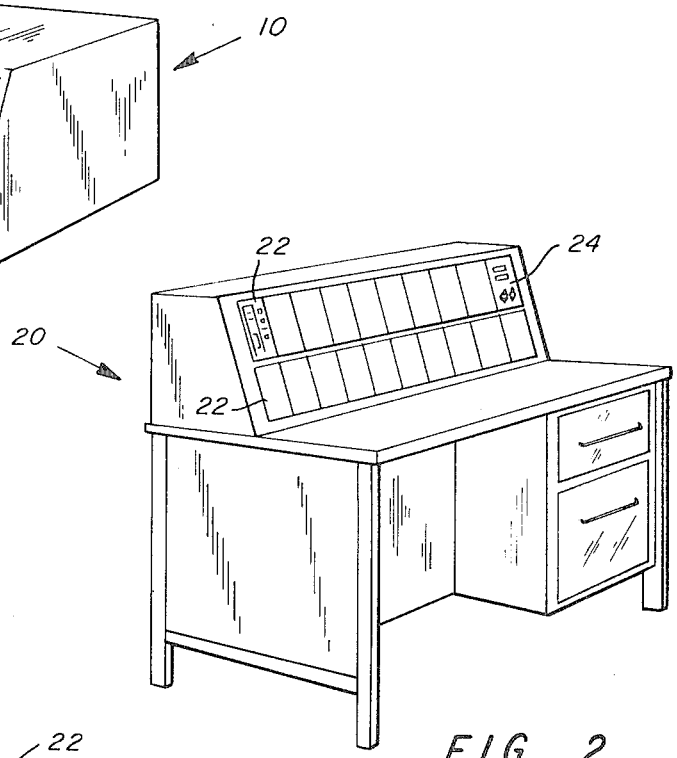
FIG. 2
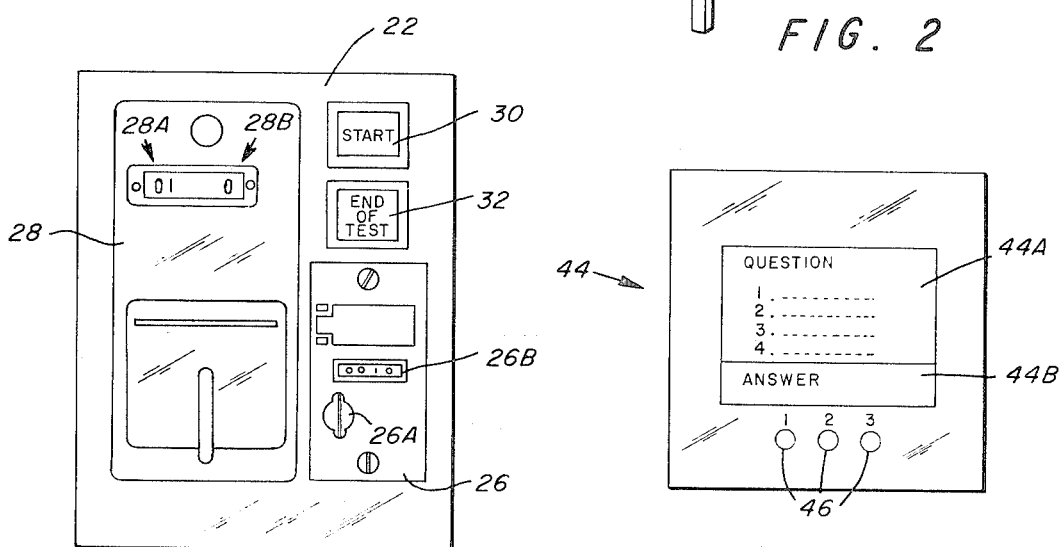
FIG. 3
FIG. 4
INVENTOR.
JOHN R. GOLDEN
BY
Head & Johnson
ATTORNEYS

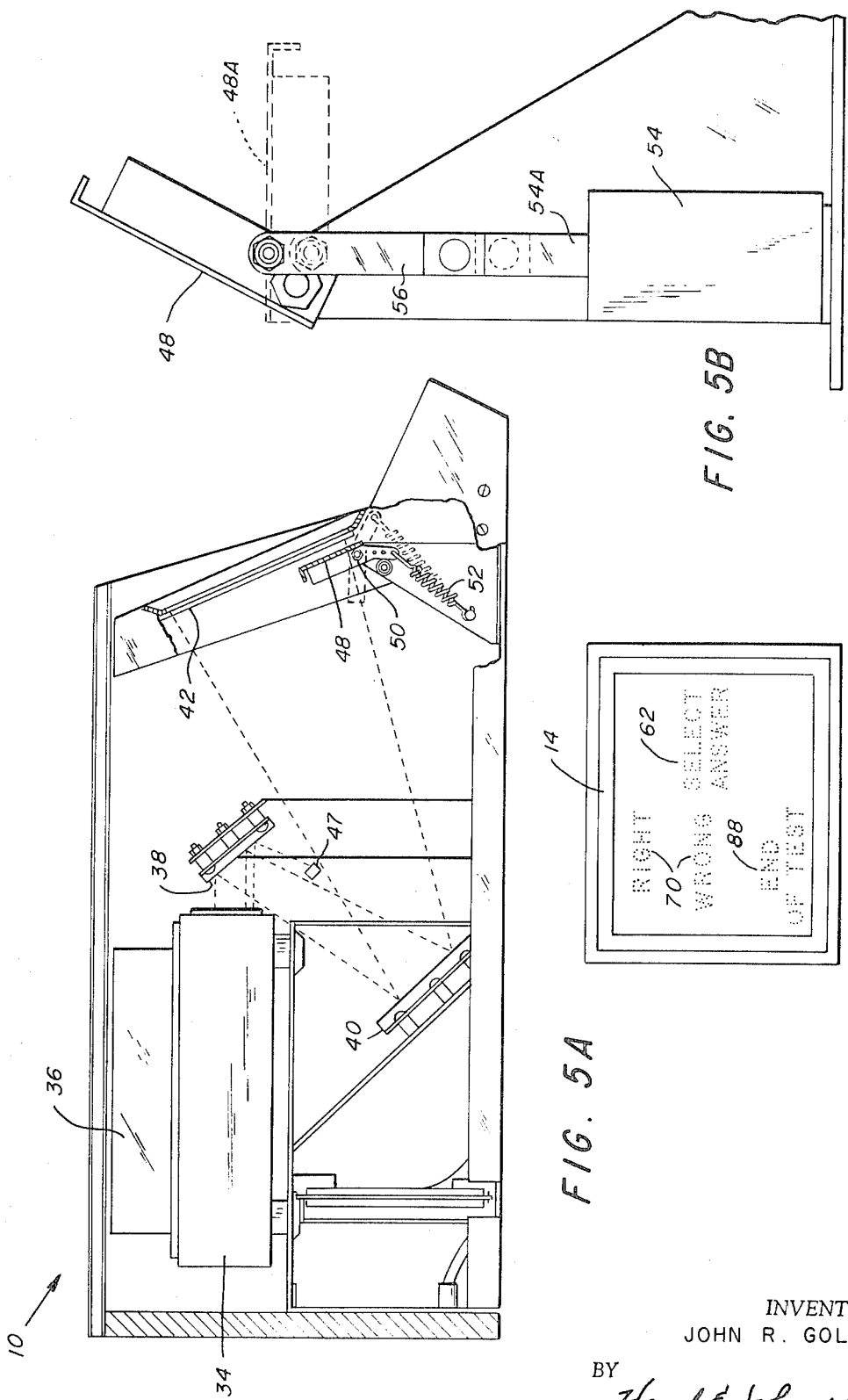

APPARATUS FOR TEACHING OR TESTING AN APPLICANT

BACKGROUND AND OBJECTS OF THE INVENTION

Audiovisual devices for instructing and evaluating applicants have long been known, however, the widespread use of such apparatus has gained prominence only in the last few years. Instructing and evaluating drivers in connection with the issuance or renewal of driver's licenses is one example of the use of such apparatus. There are an extremely large number of drivers today which need to be periodically reevaluated as to their knowledge of facts and laws relating to driving in order to effectively determine whether or not driver's licenses should be renewed. In the past license issuing agencies have conducted evaluation by written questions and answers. This procedure is so slow and time consuming that it is becoming too great a burden for most governmental agencies to sustain. In addition, the number of instructors required to administer such handwritten tests makes the expense of renewing driver's licenses prohibitive.

This invention provides an apparatus for teaching and testing applicants which is useful in innumerable applications exemplified particularly as it is used for testing and evaluating applicants for driver's licenses. The invention will be described as it specifically relates to such application, it being understood that the invention is in no wise limited to such application. In addition, the invention will be described as it relates to the teaching and testing of applicants, the expression "applicants" encompassing students, trainees, and any other persons for which instruction and/or evaluation is required.

It is therefore an object of this invention to provide an improved system and apparatus for teaching and/or testing an applicant.

More particularly, an object of this invention is to provide improved apparatus for teaching an applicant including improved means for displaying questions and answers to applicants.

Another object of this invention is to provide improved apparatus for displaying questions and answers to applicants including improved means for recording responses to such questions by the applicants.

Another object of this invention is to provide an improved method and apparatus for testing an applicant, the apparatus including a plurality of slides on which questions and answers are presented, and including means for automatically advancing the slides in random automatic unpredictable sequence.

These and other objects and a better understanding of the invention will be had by reference to the description and claims, taken in conjunction with the attached drawings.

DESCRIPTION OF THE VIEWS

FIG. 1 is an isometric view of one illustrated embodiment of a display unit of this invention for use in teaching or testing an applicant.

FIG. 2 is an examiner's desk console used to monitor a plurality of the display units.

FIG 3 is an enlarged view of a recording unit, a plurality of which are mounted on the desk console, there being one recording unit for each display unit.

FIG. 4 is a view of a slide of the type used in the display units.

FIG. 5A is a cross-sectional view of the display unit of FIG. 1 showing the internal arrangement of the apparatus.

FIG. 5B is an enlarged partial cross-sectional view of the display unit showing the means for operation of a shield to selectably conceal or display the answer to the question presented.

FIG. 7 is an enlarged view of the light panel containing the lighted instruction indicators for the applicant, such panel being a part of the display of FIG. 1.

DETAILED DESCRIPTION

Figure 6:
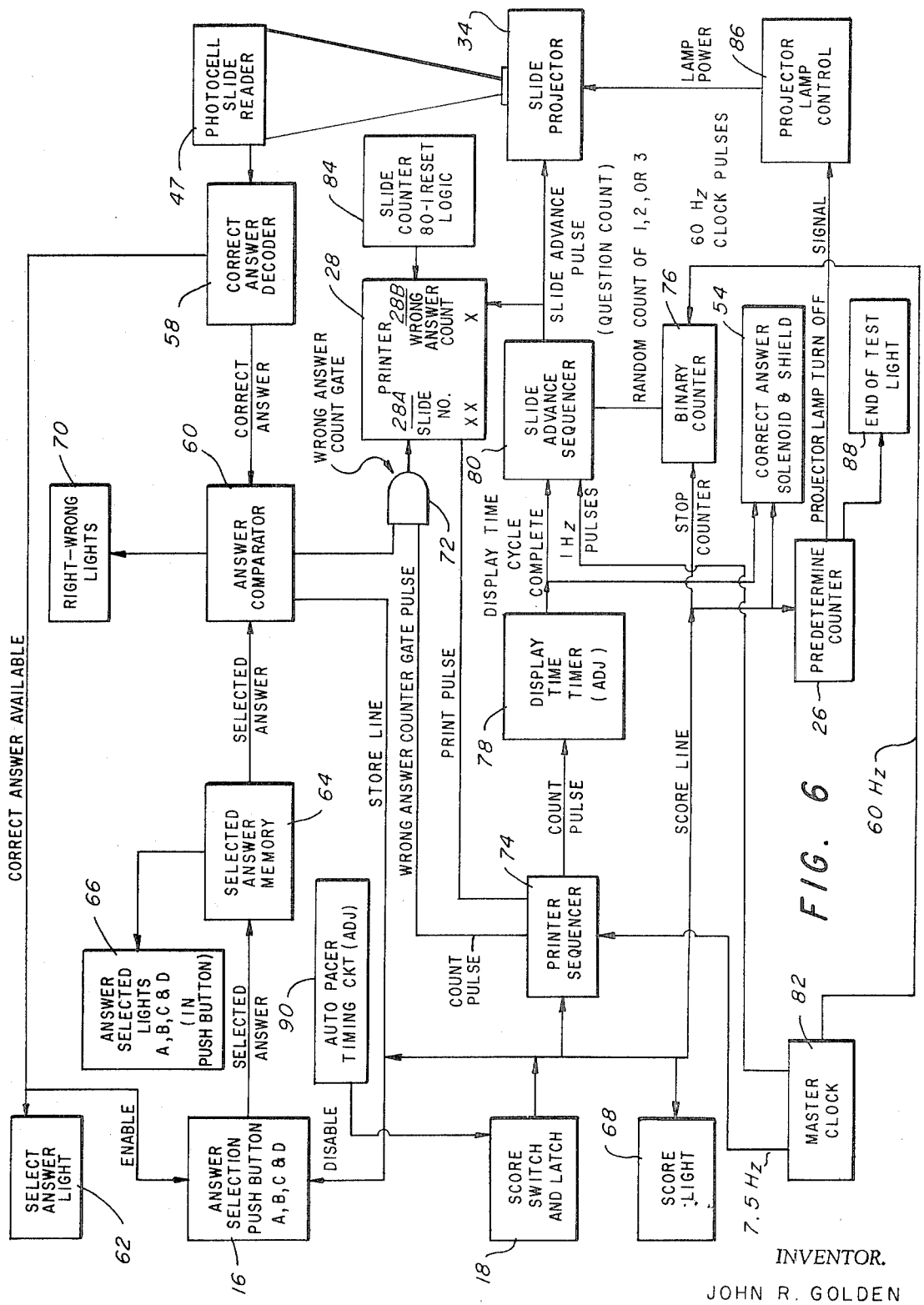
FIG. 6 is a block diagram of the system of this invention for teaching and testing applicants.

Referring to FIG. 1, a display unit generally indicated by the numeral 10 is shown. The unit 10 comprises a housing having, in the front thereof for easy viewing by an applicant, a screen 12. Below the screen is an indicator light panel 14 (shown in enlarged view in FIG. 7), four answer-select buttons 16, and a score button 18.

The screen 12 will display, when the unit is in operation, a question in the upper question portion 12A with the correct answer being displayed in the lower portion 12B. During the display of the question portion the lower portion 12B is blanked, by means which will be described subsequently, so that until the score button 18 is depressed the portion 12B is not revealed to the applicant. The indicator light panel 14 provides instructions to the applicant, including: "select answer," "right," "wrong," and "end of test," such expressions being individually displayed as required by the system.

The display unit of FIG. 1, as illustrated, is utilized by placing it on a desk top at which the applicant sits or, if on a high desk, at which the applicant stands. In addition, the display unit 10 may consist of a podium type arrangement at which the applicant stands. It is understood that the invention is not limited to the specific way in which the housing of the display unit 10 is constructed.

In the typical arrangement affording means for simultaneously evaluating a number of applicants a plurality of the display units 10 are positioned in a room in which also is positioned an instructor's console 20 (FIG. 2). Each of the display units 10 is connected by a multiconductor cable (not shown) to the console unit 20 and each is represented at the console unit 20 by a recording panel 22, the outline of only one of which is shown in FIG. 2, with space provision for a total of twenty of such panels. In addition, a master control panel 24 is provided by which the entire system is energized or deenergized. Each recording panel 22 (best shown in FIG. 3) includes a predetermining counter 26, a recorder-printer 28, a start button 30, and an end-of-test indicator 32. Counter 26 may be preset by means of knob 26A to any preselected number of questions which will constitute a test series. For instance, in FIG. 3 the numeral 10 is indicated on counter 26 indicating that the test consists of 10 questions. Each time an evaluation of an applicant is started the indicator 26B of counter 26 is returned to the preselected number of questions to be presented in the test. When the test begins the counter 26 counts down as each question is presented. When the counter 26 reaches zero the test is terminated and the end of test light 32 is illuminated.

Recorder 20 records on a strip of paper the results of each evaluation. The question number is visually indicated in the indicator in column 28A and, at the same time printed on the same strip of paper, the total accumulated wrong answer score appears in column 28B. Thereby the total wrong answer count is shown with indications of each question to which a wrong answer is given. Depressing start button 30 enables the instructor to start an evaluation, the button serving to energize the display unit 10 to which the particular recording panel is connected.

Referring to FIGS. 5A and 5B the interior arrangement of the display unit 10 is best shown. Each of the display units 10 includes a slide projector 34. Although not limited to such arrangement, the slide projector 34 may be of the type commonly referred to as the "carousel" type in which a plurality of slides is stored in a removable rotated slide carrier 36. Slide carrier 36 is capable of holding a number of slides, for instance eighty, and the projector 34 includes means for advancing the slide carrier 36, withdrawing a slide into the projector 34 for projection, returning the slide into the carrier 36, and advancing the carrier for projection of the next slide.

The image projected by projector 34 impinges on a first inclined mirror 38, thence onto a second inclined mirror 40, and from there onto the rearward surface of screen 42. As shown in FIG. 4, a typical slide 44 includes, in the portion projected for viewing, an upper question portion 44A and a lower answer portion 44B. The projection system is so arranged that unless otherwise obscured the total of portions 44A and 44B is projected onto the screen 12. Below the projection portion of slide 44 are provisions for correct answer indicator means in the form of three possible holes or appertures 46. Light from the projector passes through apertures 46, is reflected by first mirror 38, and strikes three photocells 47. By the combination of apertures the correct answer is coded into the system.

Referring back to FIG. 5A a shield 48 is shown extending across the lower portion of screen 42. The shield 48 is pivoted at 50 and is normally held by spring 52 in a position paralleling the rearward face of screen 42. In the position shown in FIG. 5A shield 48 blocks the lower portion of screen 42, that is, it blocks out the portion which otherwise would project the answer portion 44B of slide 44. Thus in the portion of shield 48 shown in FIG. 5A the answer portion of the slide is obscured and only the question portion is shown on screen 42.

In FIG. 5B there is shown a solenoid 54 having plunger 54A extending therefrom. A linkage 56 connects the plunger with shield 48. When the solenoid 54 is energized, withdrawing plunger 54A, shield 48 is pivoted into the position shown in dotted outline 48A and away from the screen 42 so that the answer portion 44B of the slide is projected onto the screen, displaying the correct answer to the applicant.

Referring to FIG. 6 a block diagram shows the system of this invention incorporating the features heretofore described. The best explanation of the operation of the system can best be given in conjunction with the block diagram of FIG. 6. Upon application of power and the pressing of the start switch 30 on a recording panel 22 a preselected display unit 10 is enabled and a test sequence started. It can be seen that an operator can start any one of a number of display units at different times so that although a large group may be tested at the same time it is not necessary that the individual applicants in the group begin and end at the same time. Pressing the start button energizes slide projector 34 displaying a question on screen 12 of the display unit 10, the answer being concealed by upstanding shield 48 (FIG. 5A). At the same time light is projected through the combination of opening 46 onto the three photocells forming the photocell slide reader 47. Correct answer decoder 58 supplies a correct answer signal to comparator 60. The select answer decoder 58 provides an enabling signal energizing the "select answer" light 62 which illuminates this designation in the indicator light panel 14 on the display unit 10 (FIG. 7). The correct answer decoder 58 also provides an enabling output to the answer selection pushbuttons A, B, C, and D (numeral 16 on FIG. 1). The select answer light signal 62 indicates to the applicant that he is to select an answer by depressing one of the four answer pushbuttons 16 located on the front of the display unit shown in FIG. 1. When a pushbutton 16 is depressed the selection is stored in a selected answer memory circuit 64 which functions to illuminate a light 66 in the answer button which has been depressed. The selected answer may be changed at any time prior to scoring. Thus if the applicant wishes to change his answer he pushes a different button 16 which information is stored in the selected answer memory circuit 34 which in turn illuminates the different answer select light 66 and clears the previously selected answer. No scoring takes place until the score switch 18 is depressed.

After an answer has been finally selected by the applicant he depresses score button 18. This initiates a score cycle which accomplishes the following action: (a) The score light 68, which is physically located within score switch 18, is illuminated; (b) Select answer light 62 is extinguished; (c) The selected answer is locked so that it cannot be changed; (d) Solenoid 54 (FIG. 5B) is actuated pulling downwardly the shield 48, displaying the correct answer portion 44B of the slide being projected on the screen 42; (e) Predetermined counter 26 (FIG. 3) is actuated indicating that the first question in the preselected number of questions has been answered; (f) The selected answer is transmitted to the answer comparator 60 wherein the selected answer is compared with the correct answer from the correct answer decoder 58; (g) Right or wrong light 70 is illuminated, the same being part of the indicator light panel 14 on the front of display unit 10; (h) A wrong answer count (if the selected answer is wrong) is transmitted to wrong answer counter gate 72 which, upon receipt of a count pulse from printer sequence 74 steps the wrong answer counter in printer 28 providing a wrong answer indication in column 28B; (i) Printer 28 actuates, by means of printer sequencer 74, to print a permanent record of the question number which is printed in column 28A at the same time the total accumulated wrong answer count is printed in column 28B; (j) Binary counter 76 is stopped; (k) Display time timer 78 is started; (i) Display time timer 78 at the end of its preset time period, transmits a signal to slide advance sequencer 80 to advance the slide projector 34; and (m) The projector lamp is turned off by projector lamp control 86 during the slide advance sequence and is turned back on following the completion of such sequence so that the next question slide is presented to the applicant.

When the select light 62 comes on the applicant may select one of the four available answers (A), (B), (C), (D), by depressing on of the buttons 16. These answer buttons 16 are of momentary type and mechanically interlocked to prevent more than one selection at a time. Each pushbutton is internally lighted by one of the answer select lights 66 so that whenever a selection is made it will light and remain lighted until a new selection is made or the slide advance sequence started.

The selected answer is stored in selected answer memory circuit 64 so that it may be displayed to the user and also compared to the correct answer in answer comparator 60. Upon the initiation of a score cycle the results of the comparison are displayed to the user as a right or wrong indication by lights 70. Also at score time, if the wrong answer has been selected this information is gated by means of a pulse from the printer sequence 74 to the wrong answer counter gate 72 and the wrong answer count is printed in printer 28.

The printer sequencer 74 generates two sequential pulses, the first a 66 millisecond pulse which gates the wrong answer (if the answer is wrong) to the wrong answer counter 72. The first pulse also starts the display time timer 78. The second pulse follows the first after a 120 millisecond delay to allow the wrong answer counter wheels time to advance into position. The second, or print pulse, is 120 milliseconds long and is used to activate the printer hammer in the printer which causes it to print out the slide number representing a question number, in column 28A, and the accumulated wrong answer total in column 28B. Upon completion of its count-print cycle the printer sequencer 74 then stops and waits for the next cycle.

The display timer 78 is adjustable and is used to determine the amount of time the correct answer is displayed to the user. During the display time, shield 48 remains down and the right or wrong light 70 remains on. In addition, the answer selected light 66 remains on, the predetermined counter 26 remains cocked, and the score light 68 remains on. At the completion of the display time timer cycle, the slide advance sequencer 80 is started. The slide advance sequencer 80 is a fixed cycle sequencer and takes approximately 6 seconds to complete a cycle. At the start of the cycle the lamp in slide projector 34 is turned out. The slide advancer sequencer generates three time spaced 500 millisecond pulses. These three pulses are gated in two groups consisting of one pulse and two pulses respectively. The binary counter 76 determines whether the one pulse or the two pulse group, or both, of gated out to the projector. Thus the slide projector will advance either one, two or three slides in a random unpredictable sequence. The binary counter 76 counts from one to three and recycles to one without passing through zero. The binary counter continuously counts 60 Hz. pulses supplied by master clock 82, the count continuing until the score switch 18 is pressed. The pressing of the score switch stops the counter at whatever count exists. If the binary counter 76 is stopped on count one the slide projector 34 will advance one slide when actuated by slide advanced sequencer 80. If the binary counter is on count two at the time the score switch 18 is pushed the slide projector advances two slides before the next slide is projected for viewing. If the binary counter is on count three at the time the score switch is pushed the slide projector advances three slides before the next slide is presented for viewing. Obviously, the binary counter 76 can be arranged to count to only two if it is desired to advance slide projector 34 randomly one or two instead of one, two or three as has been described. The binary counter 76 can be disabled and the sequence adjusted to advance one slide only in each sequence.

The printer 28 records and displays the slide number or question number in column 28A and the total accumulated wrong answer count in column 28B. A reset circuit 84 monitors the slide projector 34 and when slide position one is reached the printer counter for column 28A in printer 28 is reset so that it always agrees with the slide being projected.

The predetermined counter 26 is utilized to stop the test whenever the predetermined number of questions has been presented to the applicant. The predetermined counter 26 can be set for a test of any length from one to the maximum number of slides the projector 34 is capable of holding in the slide carrier 36, such as eighty. The predetermined counter 26 continually indicates the number of questions remaining to be answered in the test sequence. When the counter 26 reaches zero it causes the projector lamp to go out by actuation of the projector lamp control circuit 86. When knob 26A on the predetermined counter 26 is depressed by an instructor, the wrong answer counter on the printer, which prints column 28B is electrically reset to zero and also the predetermined counter 26 is mechanically reset to it preset value, such value being the number of questions to be presented in the test sequence. At the same time the end-of-test light 88 is reset off and the start switch 30 on the recorder panel 22 is enabled. The start switch 30 cannot be reenergized until after the predetermined counter has been reset.

Master clock 82 utilizes 60 Hz. power line frequency to derive output pulses of 60 Hz., 7.5 Hz., 1 Hz. which are utilized by the slide advance sequencer 80, the printer sequencer 74, and the binary counter 76 respectively.

An optional autopacer circuit 90 is provided which is adjustable from approximately 6 to 60 seconds. The autopacer circuit 90 allows a set time interval within which the applicant can answer questions. If a question is not answered in the time given the auto pacer will automatically score at the end of the preset time period and that question will be counted wrong. If an answer has been selected by the applicant depressing one of the answer buttons 16 but the score switch 18 has not been depressed, the auto pacer 90 will, at the end of the time period, score the questions right or wrong depending on the answer selected in the same manner as would occur if the applicant depressed the score switch.

Thus the invention provides a system, apparatus and circuitry for teaching and testing the applicant. The teaching function of the apparatus is derived from the fact that not only is the applicant evaluated according to the answers he selects from questions presented, but in addition, the correct answer is displayed to him. This has a valuable teaching effect as the applicant is most likely to remember the answer to the question which has been incorrectly answered immediately before. The invention is, as has previously been mentioned, particularly useful in evaluating applicants for automobile driver's license.

An important part of the invention is the means of advancing the slide projector in a random, automatic, but unpredictable sequence. This has a great advantage when a number of applicants are utilizing the system with many individual display units 10 in a single room. No two applicants will have the same sequence of slides presented. Thus one applicant cannot "copy" or depend upon another applicant for his answers. The mathematical change of two display units, sitting side-by-side, displaying the same sequence of questions is extremely unlikely. In addition, the automatic unpredictable random advance feature means that out of a large group of applicants each being evaluated utilizing the same set of 80 slides and each taking a test of, for example, 20 questions, the probability that any two of such applicants have exactly the same combination of 20 questions is extremely remote.

The invention has been described and illustrated in an arrangement incorporating four answer buttons. Obviously, either a fewer or greater number may be employed without departing from the invention. Another alternate embodiment which may be included is an autoscore arrangement which provides automatic scoring when the first answer choice button is depressed. When this option is used the applicant cannot change his mind as his first answer choice is immediately scored upon making his selection. Other alternate arrangements will be suggested to those skilled in the art.

While the invention has been described with a certain degree of particularity it is manifest that many changes may be made in the details of construction and the arrangement of components without departing from the spirit and scope of this disclosure.

What is claimed:

1. An apparatus for teaching or testing an applicant comprising:
   a screen supported for viewing by an applicant;
   a projector having a plurality of slides including means of projecting the slides one at a time onto said screen, each of said slides presenting a question to be answered;
   a score switch operable by an applicant for indication of answers selected by such applicant;
   a clock means generating evenly time spaced electrical pulses;
   a counter selectably connected to receive and count pulses from said clock means, said counter including means to count form one to n and recycle sequentially to one without passing through zero, n being a preselected maximum count number;
   means connecting said counter to said clock means in response to the projection of a said slide onto said screen whereby said counter starts counting;
   means of disconnecting said counter from said clock means in response to the actuation of said score switch whereby said counter is stopped when said score switch is actuated; and
   means of automatically advancing said projector the number of slides corresponding to the count at which said counter is stopped.

2. An apparatus for teaching or testing an applicant according to claim 8 including:
   means with said projector of automatically advancing slides at preselected time intervals whereby an applicant is presented a sequence of images.

3. An apparatus for teaching or testing an applicant according to claim 8 in which each slide presents a question to be answered and a plurality of answers from which the applicant selects an answer including:
   means with each of said slides for indicating the correct answer thereto;
   means with said projector of detecting the correct answer as indicated by each slide;
   answer switches operable by an applicant by which an answer in response to the question presented by each slide is selected, and
   means of comparing the correct answer with the answer selected when said score button is actuated to indicate whether the selected answer is correct or incorrect.

4. An apparatus for teaching or testing an applicant according to claim 10 including:
   recording means connected to said means of comparing the correct answer with the answer selected when said score button is actuated to record the correctness of answers given.

5. An apparatus for teaching or testing an applicant according to claim 4 wherein said recording means records incorrect answers.

6. An apparatus for teaching or testing an applicant according to claim 4 wherein each of said slides is assigned a number including:
   means with said projector of recording by said recording means the number of each slide projected onto said screen, and the giving of a correct or incorrect answer thereto.

7. An apparatus for teaching or testing an applicant according to claim 3 including:
   a predetermined counter connected to said projector and arranged to count each slide presented, and means of terminating the sequential display of slides when a predetermined number is reached.

8. An apparatus for teaching or testing an applicant comprising:
   a rear lighted screen supported for viewing by an applicant;
   a projector for projecting a slide onto said screen rearward side, said projector including means of projecting an image displaying a question section in the upper portion of said screen and an answer section in the lower portion of said screen;
   a shield pivotally supported adjacent said screen and pivotally positionable between a first and second position, said shield in said first position serving to obstruct said answer portion of said image to prevent the same from being displayed on said screen and in said second position serving to unobstruct said answer portion of said image to permit the same to be displayed in said screen;
   a score switch means adjacent said screen operable by applicant;
   means of automatically pivoting said shield to said second position after said score switch means has been actuated by an applicant;
   a clock means generating evenly time spaced electrical pulses;
   a counter selectably connected to receive and count pulses from said clock means from one to n and recycle to one sequentially without passing through zero;
   means connecting said counter to said clock means in response to the projection of said slide onto said screen;
   means of disconnecting said counter from said clock means when said score button is actuated whereby said counter is stopped at a count from one to n depending upon time at which said score button is actuated; and
   means of automatically advancing said projector the number of slides corresponding to the count at which said counter is stopped.

* * * * *

UNITED STATES PATENT OFFICE
CERTIFICATE OF CORRECTION

Patent No. 3,628,255  Dated December 21, 1971

Inventor(s) John R. Golden

It is certified that error appears in the above-identified patent and that said Letters Patent are hereby corrected as shown below:

Column 6, line 51, the numeral "8" should read -- 1 --; line 57, the numeral "8" should read -- 1 --; line 71, the numeral "10" should read -- 3 --.

Signed and sealed this 1st day of May 1973.

(SEAL)
Attest:

EDWARD M. FLETCHER, JR.  
Attesting Officer

ROBERT GOTTSCHALK  
Commissioner of Patents